United States Patent
Zhou

(10) Patent No.: US 9,297,948 B1
(45) Date of Patent: Mar. 29, 2016

(54) LIQUID CRYSTAL PANEL AND BACKLIGHT MODULE POSITIONING ADHESIVE STRUCTURE AND DISPLAY DEVICE

(71) Applicant: Shenzhen China Star Optoelectronics Technology Co., Ltd., Shenzhen, Guangdong (CN)

(72) Inventor: Gege Zhou, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/431,035

(22) PCT Filed: Jan. 16, 2015

(86) PCT No.: PCT/CN2015/070914
§ 371 (c)(1),
(2) Date: Mar. 25, 2015

(51) Int. Cl.
*G02F 1/1335* (2006.01)
*F21V 8/00* (2006.01)

(52) U.S. Cl.
CPC ............ *G02B 6/0086* (2013.01); *G02B 6/0055* (2013.01); *G02B 6/0081* (2013.01); *G02F 1/133512* (2013.01)

(58) Field of Classification Search
CPC ................ G02B 6/0086; G02F 1/1339; G02F 1/133618; G02F 1/133512; G02F 1/133608; G02F 2001/133311; G02F 2001/133322; G02F 2001/133325
USPC .......................................................... 349/58
See application file for complete search history.

(56) References Cited

U.S. PATENT DOCUMENTS

| | | | |
|---|---|---|---|
| 2007/0103854 A1* | 5/2007 | Yu et al. | 361/681 |
| 2013/0070179 A1* | 3/2013 | Kim | 349/58 |
| 2013/0293804 A1* | 11/2013 | Kim | 349/58 |
| 2014/0140092 A1* | 5/2014 | Kuan et al. | 362/606 |

* cited by examiner

*Primary Examiner* — Karabi Guharay
(74) *Attorney, Agent, or Firm* — Andrew C. Cheng

(57) ABSTRACT

A display device includes a backlight module positioning adhesive structure and a liquid crystal panel that includes a bezel zone and a light transmitting zone. A backlight module includes a reflector plate, a light guide plate, and the optic film that are sequentially stacked on each other and surrounded by a mold frame. The backlight module further includes a double-sided adhesive tape that includes first and second layers stacked on each other. The second layer includes a light shielding section and a light transmitting section connected to the light shielding section. The double-sided adhesive tape is adhesively bonded between the bezel zone of the liquid crystal panel and the backlight module. The light shielding section is located on an edge portion of the optic film and the mold frame. The light transmitting section extends towards the light transmitting section of the optic film.

13 Claims, 2 Drawing Sheets

LIQUID CRYSTAL PANEL AND BACKLIGHT MODULE POSITIONING ADHESIVE STRUCTURE AND DISPLAY DEVICE

CROSS REFERENCE TO RELATED APPLICATIONS

This application claims the priority of Chinese Patent Application No. 201410819628.4, entitled "Liquid Crystal Panel and Backlight Module Positioning Adhesive Structure and Display Device", filed on Dec. 24, 2014, the disclosure of which is incorporated herein by reference in its entirety.

BACKGROUND OF THE INVENTION

1. Field of the Invention

The present invention relates to the field of liquid crystal displaying technology, and in particular to a liquid crystal panel and backlight module positioning adhesive structure and a display device.

2. The Related Arts

Currently, liquid crystal display devices have been widely used in various electronic products to serve as display components of electronic devices. Following the trend of electronic products getting light and thin, bezels of electronic devices have been made increasingly slim. A backlight module is an important component of the liquid crystal display device and thus, the side frame of the backlight module is also getting thinner and thinner.

Conventional backlight modules all include a mold frame, a light guide plate surrounded by the mold frame, and an optic film fixed to the light guide plate and the mold frame by a positioning light-shielding paint tape. The liquid crystal panel is positioned on the positioning light-shielding paint tape of the backlight unit. The black double-sided adhesive tape has a width that is exactly located at a site that is invisible to human eyes. The site where light emits outward is getting increasingly narrow with the bezel width of the liquid crystal module so that the width of the positioning light-shielding paint tape is also getting narrower. This causes reduction of positioning strength between the positioning light-shielding paint tape and the optic film and consequently, it is easy that the positioning of the film becomes un-reliable. To ensure desired positioning reliability of the film, the width of the positioning light-shielding paint tape is not narrowed down unlimitedly and consequently, a black edge of the backlight unit can be observed by human eyes through the liquid crystal panel. This affects light transmission quality of the entire liquid crystal panel.

SUMMARY OF THE INVENTION

An object of the present invention is to provide a liquid crystal panel and backlight module positioning adhesive structure and a display device in order to provide the liquid crystal panel and the display device with a narrow bezel without affecting the light transmission quality.

The present invention provides a liquid crystal panel and the backlight module positioning adhesive structure, wherein the backlight module comprises a reflector plate, a mold frame, a light guide plate, and an optic film, the reflector plate, the light guide plate, and the optic film being sequentially stacked on each other, the mold frame surrounding the reflector plate, the light guide plate, and the optic film, wherein the backlight module further comprises a double-sided adhesive tape, the double-sided adhesive tape comprising a first layer and a second layer stacked on the first layer, the second layer comprising a light shielding section and a light transmitting section connected to the light shielding section, the double-sided adhesive tape adhesively bonding the liquid crystal panel and the backlight module together, the light shielding section being located on an edge portion of the optic film and the mold frame, the light transmitting section extending toward a light transmitting section of the optic film.

In the above liquid crystal panel and the backlight module positioning adhesive structure, the mold frame comprises a sidewall, the sidewall having a top surface that is on the same horizontal surface as the optic film, the first layer of the double-sided adhesive tape being adhesively attached to the top surface of the mold frame and the edge portion of the optic film.

In the above liquid crystal panel and the backlight module positioning adhesive structure, the second layer is adhesively attached to the liquid crystal panel.

In the above liquid crystal panel and the backlight module positioning adhesive structure, the light shielding section of the double-sided adhesive tape comprises black light-shielding paint and the light transmitting section comprises optically processed optic adhesive.

In the above liquid crystal panel and the backlight module positioning adhesive structure, the backlight module further comprises a backplane, the backplane comprising a bottom board and a side board, the reflector plate being mounted between the bottom board and the light guide plate, the double-sided adhesive tape partly and adhesively attached to the side board.

In the above liquid crystal panel and the backlight module positioning adhesive structure, the first layer and the second layer have outer surfaces on which transparent adhesive is provided.

The present invention also provides a display device, which comprises a backlight module positioning adhesive structure and a liquid crystal panel, the liquid crystal panel comprising a bezel zone and a light transmitting zone, the backlight module comprising a reflector plate, a mold frame, a light guide plate, and an optic film, the reflector plate, the light guide plate, and the optic film being sequentially stacked, the mold frame surrounding the reflector plate, the light guide plate, and the optic film, the backlight module further comprising a double-sided adhesive tape, the double-sided adhesive tape comprising a first layer and a second layer stacked on the first layer, the second layer comprising a light shielding section and a light transmitting section connected to the light shielding section, the double-sided adhesive tape adhesively bonding the liquid crystal panel and the backlight module together, the light shielding section being located on an edge portion of the optic film and the mold frame, the light transmitting section extending toward a light transmitting section of the optic film, the double-sided adhesive tape having a length corresponding to a width of the bezel zone.

In the above display device, the second layer is adhesively attached to the bezel zone of the liquid crystal panel, the light transmitting section being located on the bezel zone and adjacent to a border between the bezel zone and the light transmitting zone.

In the above display device, the mold frame comprises a sidewall, the sidewall having a top surface that is on the same horizontal surface as the optic film, the first layer of the double-sided adhesive tape being adhesively attached to the top surface of the mold frame and the edge portion of the optic film.

In the above display device, the light shielding section of the double-sided adhesive tape comprises black light-shielding paint and the light transmitting section comprises optically processed optic adhesive.

In the above display device, the second layer is adhesively attached to the liquid crystal panel.

In the above display device, the backlight module further comprises a backplane, the backplane comprising a bottom board and a side board, the reflector plate being mounted between the bottom board and the light guide plate, the double-sided adhesive tape partly and adhesively attached to the side board.

In the above display device, the first layer and the second layer have outer surfaces on which transparent adhesive is provided.

The present invention provides a backlight module positioning adhesive structure that comprises a double-sided adhesive tape having a light shielding section and a light transmitting section. The double-sided adhesive tape is entirely and adhesively attached to a bezel zone of the liquid crystal panel and a mold frame and an edge of an optic film of a backlight module that correspond to the bezel zone so as to enhance the bonding force of the double-sided adhesive tape applied to the backlight module and the liquid crystal panel and avoid influence of the quality of the backlight module and the liquid crystal panel during assembly and test. Further, in addition to the function of adhesive bonding, the light transmitting section also allows light to transmit, as fast as possible, through the light guide plate so as to ensure the light intensity of the liquid crystal panel and also achieve a technical effect of narrowing the bezel.

BRIEF DESCRIPTION OF THE DRAWINGS

To more clearly explain the technical solutions proposed in embodiments of the present invention or those of the prior art, a brief description of the drawings that are necessary for describing the embodiments of the present invention or the prior art is given as follows. It is obvious that the drawings that will be described below show only some embodiments of the present invention. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to technical solutions of embodiments of the present invention with reference to the attached drawings of the embodiments of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

Figure 1:
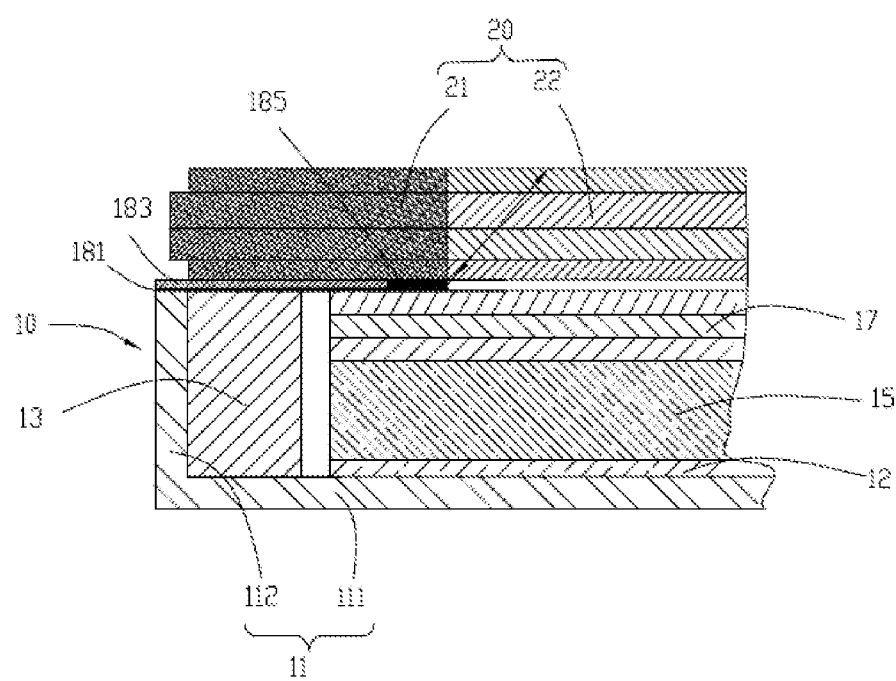
FIG. 1 is a schematic view showing a cross-section of a display device according to an embodiment of the present invention, which comprises a backlight module positioning adhesive structure of the present invention.
Figure 2:
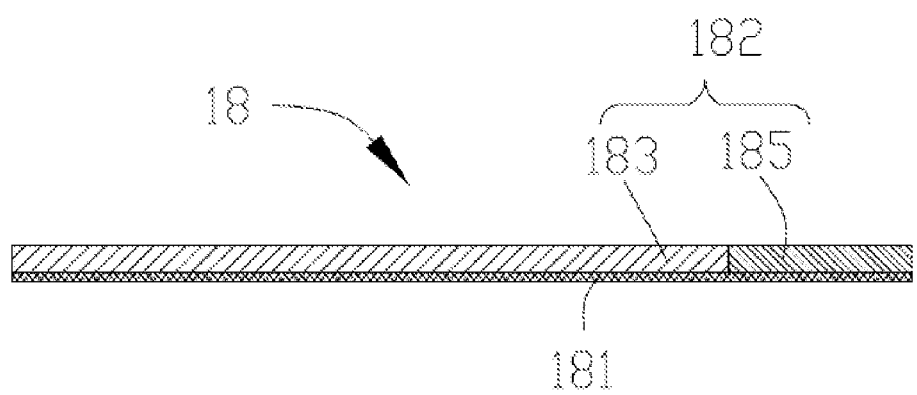
FIG. 2 is a schematic view showing a double-sided adhesive tape structure of the backlight module positioning adhesive structure of FIG. 1.

Referring to FIGS. 1 and 2, a preferred embodiment of the present invention provides a positioning adhesive of a liquid crystal panel 20 and a backlight module. The liquid crystal panel 20 comprises a bezel zone 21 and a light transmitting zone 22. The bezel zone 21 is arranged to surround the light transmitting zone 22. The backlight module 10 comprises a reflector plate 12, a mold frame 13, a light guide plate 15, and an optic film 17. The reflector plate 12, the light guide plate 15, and the optic film 16 are sequentially stacked on each other and the mold frame 13 surrounds the reflector plate 12, the light guide plate 15, and the optic film 16. The backlight module further comprises a double-sided adhesive tape 18. The double-sided adhesive tape 18 comprises a first layer 181 and a second layer 182 stacked on the first layer 181. The second layer 182 comprises a light shielding section 183 and a light transmitting section 185 connected to the light shielding section 183. The double-sided adhesive tape 18 adhesively bonds the liquid crystal panel 20 and the backlight module 10 together. The light shielding section 183 is located on an edge portion of the optic film 17 and the mold frame 13. The light transmitting section 185 extends to a light transmitting section of the optic film 17. The double-sided adhesive tape 18 has a length corresponding to a width of the bezel zone 21. Surfaces of the first layer 181 and the second layer 182 are both coated with transparent adhesive to provide a function of adhesive bonding of the double-sided adhesive tape.

Further, the backplane 11 comprises a bottom board 111 and a side board 112. The bottom board 111 and the side board 112 collectively delimit a receiving space for receiving the mold frame 13, the light guide plate 15, and the optic film 17. The reflector plate 12 is mounted between the bottom board 111 and the light guide plate 15. The double-sided adhesive tape 18 is partly and adhesively attached to the side board 112.

In the instant embodiment, the mold frame 13 comprises a sidewall 131 of which a surface, which is a top surface (not labeled) of side walls 13, that is on the same horizontal surface as the optic film 17. The first layer 181 of the double-sided adhesive tape 18 is adhesively attached to the top surface of the mold frame 13 and the edge portion of the optic film 17. In the instant embodiment, the first layer 181 is a transparent layer.

Further, the second layer 182 is adhesively attached to the liquid crystal panel 20. In the instant embodiment, the second layer 182 is adhesively attached to the bezel zone 21 of the liquid crystal panel 20 and the light transmitting section 185 is located on the bezel zone 21 and adjacent to a border between the bezel zone 21 and the light transmitting zone 22. The length of the double-sided adhesive tape 18 is identical to the width of the bezel zone 21 and the light transmitting section 185 extends from the light shielding section 183 to a location of the border between the bezel zone 21 and the light transmitting zone 22.

Further, the light shielding section 183 of the double-sided adhesive tape 18 comprises a black light-shielding paint. The light transmitting section 185 comprises optic adhesive that is subjected to optic processing. When light transmits from the liquid crystal panel into the optic film 17, light traveling in an inclined direction may transmit through the light transmitting section 185 to similarly pass through the optic film 17 to enter the light guide plate 15, so that incidence and exit of light are not affected. In other embodiments, an outside surface of the first layer 181 and a corresponding portion of the light shielding section 183 are each coated with a black light-shielding paint layer, and a transparent adhesive is arranged on an outer side of the black light-shielding paint layer.

The present invention provides a backlight module positioning adhesive structure that comprises a double-sided adhesive tape 18 having a light shielding section 183 and a light transmitting section 185. The double-sided adhesive tape 18 is entirely and adhesively attached to a bezel zone 21 of the liquid crystal panel and a mold frame 13 and an edge of an optic film 17 of a backlight module 10 that correspond to the bezel zone 21 so as to enhance the bonding force of the double-sided adhesive tape 18 applied to the backlight module 10 and the liquid crystal panel 20 and avoid influence of the quality of the backlight module and the liquid crystal panel during assembly and test. Further, in addition to the function of adhesive bonding, the light transmitting section 185 also allows light to transmit through the light guide plate 15 and get reflected so as to ensure the light intensity of the liquid crystal panel 20. Further, when viewing a liquid crystal screen, bare eyes cannot see the light transmitting section 183 so that a technical effect of narrowing the bezel can be achieved.

Disclosed above is only one preferred embodiment of the present invention, which does not impose undue constraints to the scope of protection of the present invention. Those having ordinary skills of the art may readily appreciate that equivalent modifications that allow for realization of all or part of the operation process of the preferred embodiment described above and comply with the requirement defined in the appended claims are considered within the protection scope covered by the present invention.

What is claimed is:

1. A liquid crystal panel and a backlight module positioning adhesive structure, wherein the backlight module comprises a reflector plate, a mold frame, a light guide plate, and an optic film, the reflector plate, the light guide plate, and the optic film being sequentially stacked on each other, the mold frame surrounding the reflector plate, the light guide plate, and the optic film, wherein the backlight module further comprises a double-sided adhesive tape, the double-sided adhesive tape comprising a first layer and a second layer stacked on the first layer, the second layer comprising a light shielding section and a light transmitting section connected to the light shielding section, the double-sided adhesive tape adhesively bonding the liquid crystal panel and the backlight module together, the light shielding section being located on an edge portion of the optic film and the mold frame, the light transmitting section extending toward a light transmitting section of the optic film.

2. The liquid crystal panel and the backlight module positioning adhesive structure as claimed in claim 1, wherein the mold frame comprises a sidewall, the sidewall having a top surface that is on the same horizontal surface as the optic film, the first layer of the double-sided adhesive tape being adhesively attached to the top surface of the mold frame and the edge portion of the optic film.

3. The liquid crystal panel and the backlight module positioning adhesive structure as claimed in claim 2, wherein the second layer is adhesively attached to the liquid crystal panel.

4. The liquid crystal panel and the backlight module positioning adhesive structure as claimed in claim 3, wherein the light shielding section of the double-sided adhesive tape comprises black light-shielding paint and the light transmitting section comprises optically processed optic adhesive.

5. The liquid crystal panel and the backlight module positioning adhesive structure as claimed in claim 4, wherein the backlight module further comprises a backplane, the backplane comprising a bottom board and a side board, the reflector plate being mounted between the bottom board and the light guide plate, the double-sided adhesive tape partly and adhesively attached to the side board.

6. The liquid crystal panel and the backlight module positioning adhesive structure as claimed in claim 1, wherein the first layer and the second layer have outer surfaces on which transparent adhesive is provided.

7. A display device, comprising a backlight module positioning adhesive structure and a liquid crystal panel, the liquid crystal panel comprising a bezel zone and a light transmitting zone, the backlight module comprising a reflector plate, a mold frame, a light guide plate, and an optic film, the reflector plate, the light guide plate, and the optic film being sequentially stacked, the mold frame surrounding the reflector plate, the light guide plate, and the optic film, the backlight module further comprising a double-sided adhesive tape, the double-sided adhesive tape comprising a first layer and a second layer stacked on the first layer, the second layer comprising a light shielding section and a light transmitting section connected to the light shielding section, the double-sided adhesive tape adhesively bonding the liquid crystal panel and the backlight module together, the light shielding section being located on an edge portion of the optic film and the mold frame, the light transmitting section extending toward a light transmitting section of the optic film, the double-sided adhesive tape having a length corresponding to a width of the bezel zone.

8. The display device as claimed in claim 7, wherein the second layer is adhesively attached to the bezel zone of the liquid crystal panel, the light transmitting section being located on the bezel zone and adjacent to a border between the bezel zone and the light transmitting zone.

9. The display device as claimed in claim 7, wherein the mold frame comprises a sidewall, the sidewall having a top surface that is on the same horizontal surface as the optic film, the first layer of the double-sided adhesive tape being adhesively attached to the top surface of the mold frame and the edge portion of the optic film.

10. The display device as claimed in claim 7, wherein the light shielding section of the double-sided adhesive tape comprises black light-shielding paint and the light transmitting section comprises optically processed optic adhesive.

11. The display device as claimed in claim 7, wherein the second layer is adhesively attached to the liquid crystal panel.

12. The display device as claimed in claim 9, wherein the backlight module further comprises a backplane, the backplane comprising a bottom board and a side board, the reflector plate being mounted between the bottom board and the light guide plate, the double-sided adhesive tape partly and adhesively attached to the side board.

13. The display device as claimed in claim 7, wherein the first layer and the second layer have outer surfaces on which transparent adhesive is provided.

\* \* \* \* \*